Feb. 24, 1970     T. R. STOCKTON     3,496,790

MULTIPLE RATIO TORQUE DELIVERY GEARING FOR A GAS TURBINE ENGINE

Filed March 4, 1968

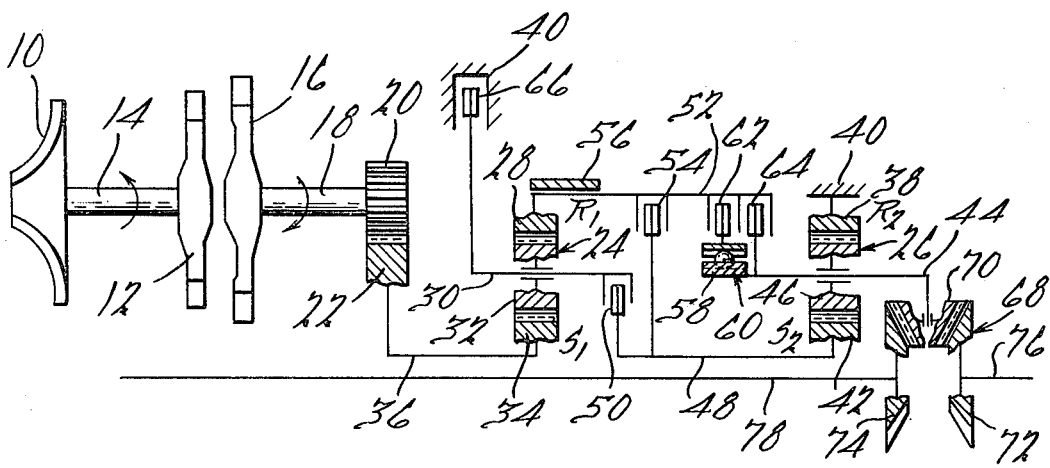

Fig. 1.

| Band Clutch Shift | Low | $\left(1+\dfrac{R_1}{S_1}\right)\left(1+\dfrac{R_2}{S_2}\right)$ |
|---|---|---|
| | Int. | $\left(1+\dfrac{R_1}{S_1}\right)\left(1+\dfrac{R_2}{S_2}\right)-\dfrac{R_1}{S_1}$ |
| Non. Synchr Shift | 3rd. | $\left(1+\dfrac{R_2}{S_2}\right)$ |
| | Rev. | $-\left(\dfrac{R_1}{S_1}\right)\left(1+\dfrac{R_2}{S_2}\right)$ |

Fig. 2.

INVENTOR:
Thomas R. Stockton
BY
ATTORNEYS

United States Patent Office 3,496,790
Patented Feb. 24, 1970

3,496,790
MULTIPLE RATIO TORQUE DELIVERY GEARING
FOR A GAS TURBINE ENGINE
Thomas R. Stockton, Ann Arbor, Mich., assignor to Ford
Motor Company, Dearborn, Mich., a corporation of
Delaware
Filed Mar. 4, 1968, Ser. No. 710,301
Int. Cl. F16h 3/62, 57/10
U.S. Cl. 74—764                    4 Claims

ABSTRACT OF THE DISCLOSURE

This specification describes a multiple-ratio, planetary gearing system for use with a gas turbine engine in an automotive vehicle driveline.

The overall speed-ratio can be increased beyond the basic ratio as the driveline is conditioned for either of two additional underdrive speed-ratios or a single reverse-drive speed-ratio. One element of the gearing, which is anchored to the transmission housing, serves as a reaction point for the system when the reaction torque loads are at a maximum.

BRIEF SUMMARY OF THE INVENTION

The gearing system of my invention is adapted especially to be used with a gas turbine power plant in an automotive vehicle driveline. It comprises two simple planetary gear units having elements capable of establishing three forward-drive speed-ratios, each of which is an underdrive ratio, and a single reverse ratio. Selectively engageable clutches and brakes are provided to establish the various power flow paths through the gearing. The ring gear for one of the planetary gear units is connected permanently to the transmission housing. This ring gear serves as a reaction point during low speed-ratio, underdrive operation as well as during reverse-drive operation when the torque reaction loads are at a maximum. It is not necessary to rely upon a friction brake for accommodating the entire torque reaction under these driving conditions.

Three clutches and two brakes are arranged to provide optimum quality ratio changes from the low speed ratio to the intermediate underdrive ratio and to provide a non-synchronous ratio shift from the intermediate underdrive ratio to the highest cruising ratio. During low speed-ratio operation, a friction brake is used to complement the action of the fixed ring gear. The torque loads accommodated by the low speed-ratio brake therefore permits a smooth, synchronous transition in the torque delivery path as the brake is released and a companion, intermediate, underdrive clutch is applied. This synchronism results in optimum shift quality which would not be available if the entire torque reaction at the time of the upshift were to be transmitted through a single brake.

Torque multiplication occurs in both planetary gear units during operation in the lowest underdrive ratio as well as in the intermediate, underdrive ratio. Both gear units function also to multiply torque during operation in reverse.

A single planetary gear unit establishes torque multiplication during operation in the cruising ratio following the acceleration period. This multiplication is available through the entire drive range thereby providing a base ratio, the characteristics of which can be complemented when the torque demand increases during forward drive or during operation in reverse.

BRIEF DESCRIPTION OF THE DRAWING

FIGURE 1 in the drawing shows in schematic, cross-sectional form a gearing assembly embodying the improvements of my invention in combination with the power turbine of a gas turbine automotive power plant.

FIGURE 2 is a chart showing the clutch and brake engagement pattern, together with the various torque ratios.

PARTICULAR DESCRIPTION OF THE INVENTION

In the drawing, numeral 10 designates the impeller of an air compressor for a gas turbine power plant. The compressor impeller is connected drivably to compressor turbine 12 through a turbine shaft 14. The air compressed by the impeller is received in a diffuser and is discharged therefrom under pressure into the combustion chamber for the power plant after being mixed with combustible fuel. The combustion products, as they expand, are driven through nozzles which power the turbine 12.

Situated on the downstream side of the turbine 12 is a power turbine 16 which receives the combustion gases passing through the blades of the turbine 12. Exhaust gases are transferred through a heat regenerator and then are discharged through an exhaust port. The turbine 16 is connected drivably by a turbine shaft 18 to power input gear 20 for an engine speed reducing gearing unit. This unit includes also gear 22 of substantially greater diameter than the gear 20. The speed reduction accomplished by the gears 20 and 22 may be 15:1.

Two simple planetary gear units are shown at 24 and 26. Gear unit 24 includes ring gear 28, carrier 30, planet pinions 32 journalled rotatably on the carrier 30, and sun gear 34. Gear 22 is connected drivably to the sun gear 34 through sleeve shaft 36. The gear unit 26 includes ring gear 38 which is connected permanently to housing 40 for the transmission mechanism. Gear unit 26 includes also sun gear 42, carrier 44 and planet pinions 46 journalled rotatably on the carrier 44 in meshing engagement with the ring gear 38 and the sun gear 42. The sun gear 42 is connected drivably to sleeve shaft 48. This shaft can be connected during forward drive operation to the carrier 30 by means of a forward-drive, selectively engageable, friction clutch 50.

Sun gear shaft 48 can be connected during third speed ratio operation and during reverse drive to clutch and brake drum 52 through a selectively engageable friction clutch 54. The drum 52 is connected directly to the ring gear 28, and it is surrounded by low speed ratio brake band 56. This can be applied and released in the usual fashion by a fluid pressure operated servo thereby anchoring selectively the drum 52.

Carrier 44 is connected to the inner race 58 of an overrunning clutch 60. The outer race of the clutch 60 can be connected to the drum 52 through a selectively engageable friction clutch 62 during operation in the second underdrive ratio. If hill braking operation is desired during operation in the second underdrive ratio, the clutch 60 can be bypassed and the drum 52 can be connected to the carrier 44 instead of through selectively engageable hill brake clutch 64.

During reverse drive operation, carrier 30 can be anchored to the housing 40 by means of a selectively engageable reverse brake 66.

The torque output element for the gearing system is carrier 44. It is connected to the carrier of a differential gear unit identified generally by reference character 68. This includes pinions 70 journalled on the carrier which in turn is connected to the carrier 44. Pinions 70 engage side bevel gears 72 and 74, and axle shaft 76 is connected to the side gear 72 and a companion axle shaft 78 is connected to the side gear 74.

Shaft 78 extends through the sleeve shafts 36 and 48. It is adapted to be connected at its outboard end to a U-joint for a traction wheel axle. A corresponding connection can be provided between the shaft 76 and the other vehicle traction wheel axle.

During operation the gas turbine can be controlled by a suitable fuel control system to provide a variable power source. The torque of the power turbine 16 during low speed ratio operation is transmitted to the sun gear 44 after being multiplied by the gears 20 and 22.

The clutch 50 is engaged during operation in each of the three forward drive speed ratios. Brake band 56 is applied to establish low speed ratio operation, and brake 66 and clutches 54, 62 and 84 are released. Sun gear torque delivered to sun gear 34 is multiplied by the gear unit 24 as carrier 30 acts as a torque output member for the gear unit 24. The carrier torque is transferred through the forward clutch 50 to the sun gear 42. The resultant torque again is multiplied with the gear 38 acting as a reaction point thereby driving the output carrier 44 at a ratio that is a function of the individual ratios of the gear units. At this time there are two reaction points in the drive system, one being provided by the continuous reaction point at gear 38 and the other being provided by the brake band 56.

To condition the mechanism for an upshift from the lowest speed ratio to the intermediate, underdrive ratio, it merely is necessary to release the band 56 in synchronism with the application of clutch 62. Because of the reaction torque division during low speed drive, the magnitude of the torque acting on the brake band 56 is of a reduced value. The release of the brake band 56 and the application of the clutch 62 can be established with a high degree of smoothness because of the low magnitudes of the torques involved. After the brake band 56 is released and the clutch 62 is applied, the multiplication ratio is reduced by an amount that is equal to the ratio of the number of teeth in the ring gear 28 to the number of teeth in the sun gear 34. The torque applied to the sun gear 34 during intermediate speed ratio operation causes the carrier 30 to be driven. This carrier torque is distributed through the clutch 50 to the sun gear 42, thus causing the sun gear 42 to rotate in the same direction as the direction of rotation of the sun gear 34. Because of the resistance offered by the sun gear 42 to rotation, a reaction torque is distributed to the ring gear 28. This reaction torque is transferred through the overrunning clutch 60 to the carrier 44. This carrier torque component is subtracted from the carrier torque component produced by the torque applied to the sun gear 42 as the ring gear 38 continues to act as a reaction point. The net torque ratio under these conditions then is equal to the torque ratio available during low speed ratio operation minus the ratio of the pitch diameters of the ring gear 28 and sun gear 34.

The highest forward driving speed ratio is achieved by applying clutch 54. At that time the overrunning clutch 60 freewheels. The friction clutch 62 can remain applied. The front gear unit is locked up and all of the input torque received from the gear 22 is distributed to the sun gear 42. With the ring gear 38 again acting as a reaction point, carrier 44 is driven with a speed ratio equal to the basic ratio.

Reverse drive is obtained by releasing the forward drive clutch 50 and then applying the reverse clutch 54. At the same time carrier 30 is anchored by the brake 66. Again there are two reaction points in the system, one being the brake 66 and the other being the ring gear 38. A reaction torque division again then occurs.

Having thus described a preferred form of my invention, what I claim and desire to secure by U.S. Letters Patent is:

1. A planetary gear system for delivering torque from a power turbine to a driven member comprising a pair of simple planetary gear units, each of the units comprising a ring gear, a sun gear, a carrier, planet pinions rotatably journalled on said carrier in meshing engagement with said sun and ring gears, speed reduction gearing connected between said power turbine and the sun gear of the first of said gear units, the carrier of the second of said gear units being connected to said driven member, means for anchoring continuously the ring gear of said second gear unit, selectively-engageable forward-drive clutch means for connecting the carrier of said first gear unit and the sun gear of said second gear unit, second clutch means engageable together with said forward drive clutch means for connecting together two torque delivery elements of said first gear unit during third speed-ratio forward-drive operation, said second clutch means being engageable during reverse drive operation to connect the ring gear of said first gear unit and the sun gear of the second gear unit, selectively engageable brake means for anchoring the ring gear of said first gear unit during low speed-ratio forward-drive operation, third clutch means for connecting together during intermediate speed-ratio operation the ring gear of said first gear unit and the carrier of said second gear unit, and brake means for anchoring the carrier of said first gear unit during reverse drive operation.

2. A planetary gear system for delivering torque from a power turbine to a driven member comprising a pair of simple planetary gear units, each of the units comprising a ring gear, a sun gear, a carrier, planet pinions rotatably journalled on said carrier in meshing engagement with said sun and ring gears, speed reduction gearing connected between said power turbine and the sun gear of the first of said gear units, the carrier of the second of said gear units being connected to said driven member, means for anchoring continuously the ring gear of said second gear unit, selectively-engageably forward-drive clutch means for connecting the carrier of said first gear unit and the sun gear of said second gear unit, second clutch means engageable together with said forward drive clutch means for connecting together two torque delivery elements of said first gear unit during third speed-ratio forward-drive operation, said second clutch means being engageable during reverse drive operation to connect the ring gear of said first gear unit and the sun gear of the second gear unit, selectively engageable brake means for anchoring the ring gear of said first gear unit during low speed-ratio forward-drive operation, third clutch means for connecting together during intermediate speed-ratio operation the ring gear of said first gear unit and the carrier of said second gear unit, brake means for anchoring the carrier of said first gear unit during reverse drive operation, a driven shaft mounted concentrically within each gear unit, and a differential gear mechanism drivably connecting said driven member and said driven shaft.

3. The combination as set forth in claim 1 wherein the clutch means for connecting the carrier of said second gear unit with the ring gear of said first gear unit includes an overrunning clutch having an outer race and an inner race, one race being connected to the carrier of said second gear unit and a friction clutch element connected to the outer race thereof, and selectively engageable clutch means including said friction clutch element for connecting said outer race to the ring gear of said first gear unit whereby a non-synchronous ratio change from the intermediate forward-driving ratio to the high-speed forward-driving ratio is achieved.

4. The combination as set forth in claim 2 wherein the clutch means for connecting the carrier of said second gear unit with the ring gear of said first gear unit includes an overrunning clutch having an outer race and an inner race, one race being connected to the carrier of said second gear unit and a friction clutch element connected to the outer race thereof, and selectively engageable clutch means including said friction clutch element for connecting said outer race to the ring gear of said first gear unit whereby a non-synchronous ratio change from the intermediate forward-driving ratio to the high-speed forward-driving ratio is achieved.

References Cited

UNITED STATES PATENTS

| | | | |
|---|---|---|---|
| 2,786,369 | 3/1957 | Simpson | 74—759 |
| 2,990,727 | 7/1961 | Miller | 74—759 |
| 3,103,832 | 9/1963 | Foerster | 74—759 |
| 3,173,310 | 3/1965 | Moan | 74—759 XR |

DONLEY J. STOCKING, Primary Examiner

THOMAS C. PERRY, Assistant Examiner

U.S. Cl. X.R.

74—674